No. 665,449. Patented Jan. 8, 1901.
C. W. LARSON.
BRUSH CARRIER.
(Application filed Oct. 23, 1899.)
(No Model.) 2 Sheets—Sheet 1.
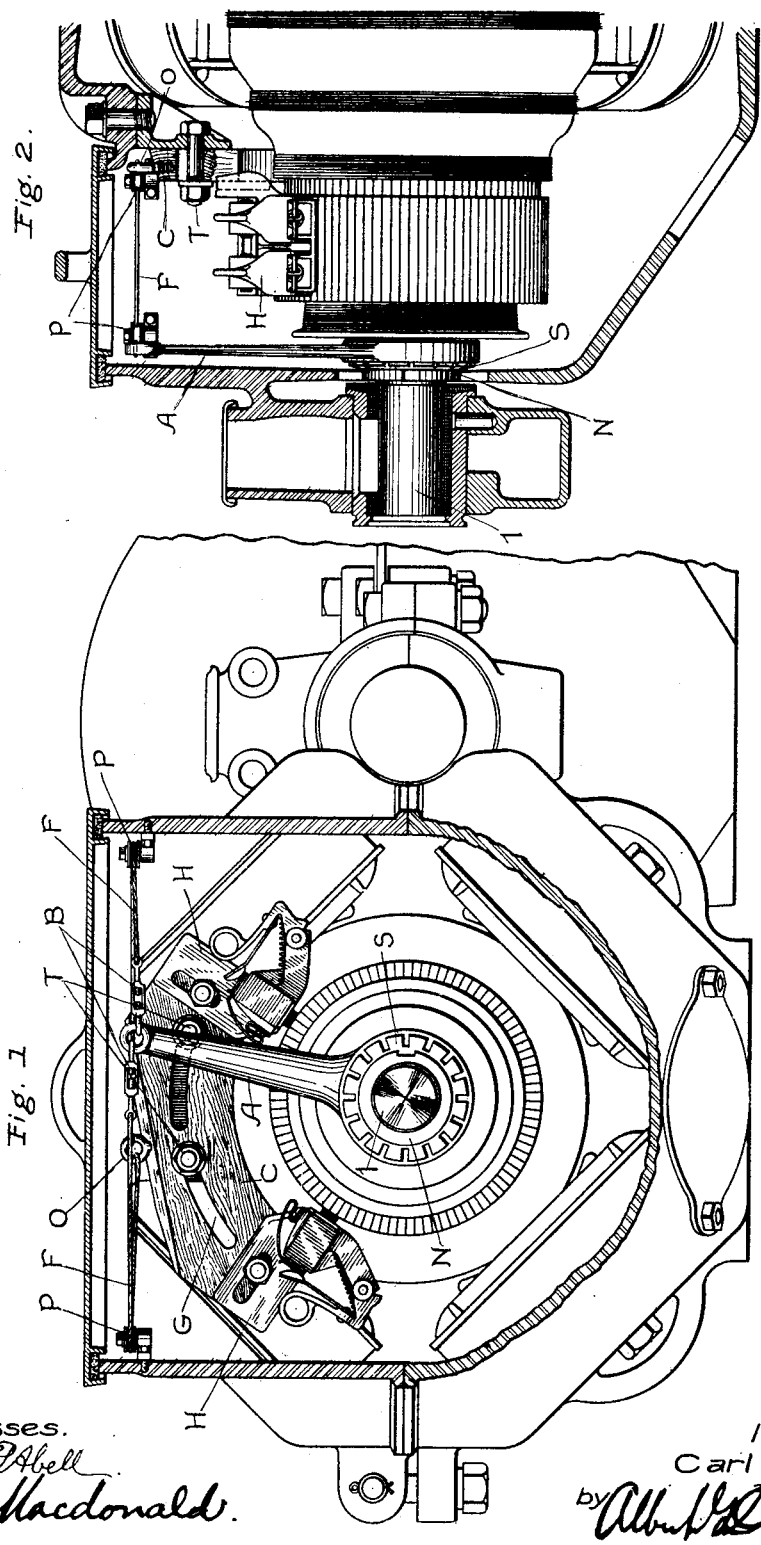
Witnesses.
Lewis P. Abell
A. F. Macdonald.
Inventor.
Carl W. Larson.
by Albert H. Davis
Atty No. 665,449. Patented Jan. 8, 1901.
C. W. LARSON.
BRUSH CARRIER.
(Application filed Oct. 23, 1899.)
(No Model.) 2 Sheets—Sheet 2.
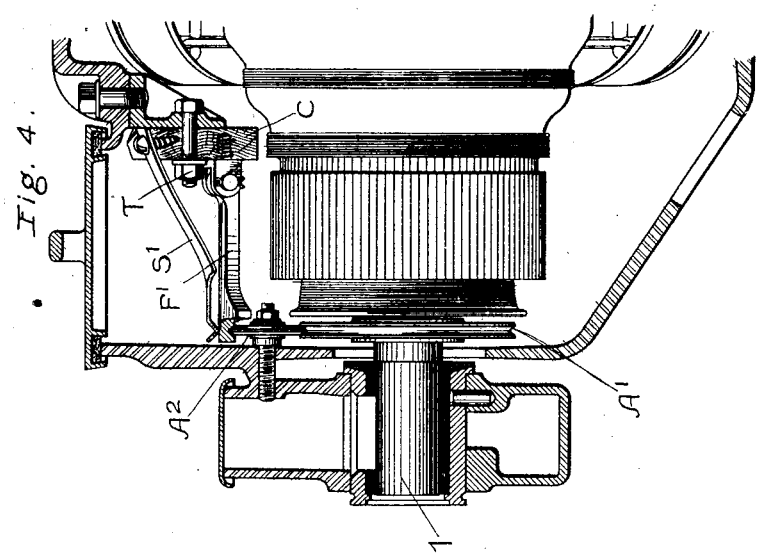
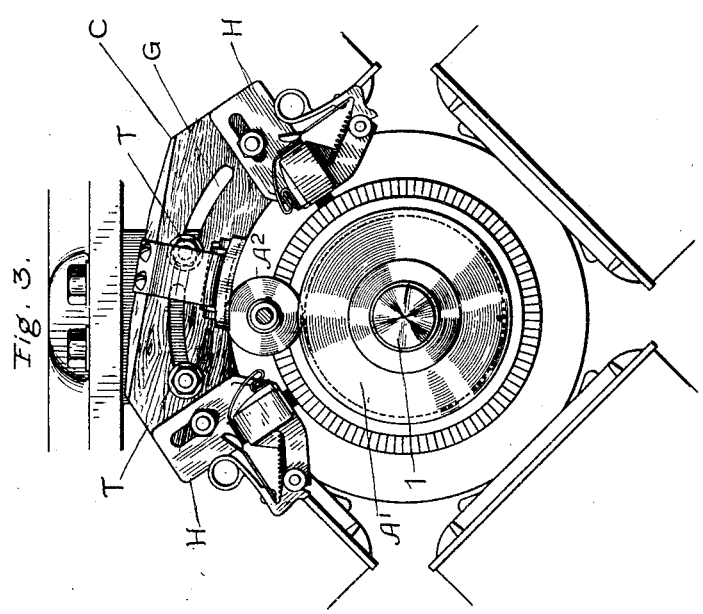
Witnesses.
Lewis P. Abell
A. F. Macdonald.
Inventor.
Carl W. Larson.
by Albert G. Davis
Atty

UNITED STATES PATENT OFFICE.

CARL W. LARSON, OF SCHENECTADY, NEW YORK, ASSIGNOR TO THE GENERAL ELECTRIC COMPANY, OF NEW YORK.

BRUSH-CARRIER.

SPECIFICATION forming part of Letters Patent No. 665,449, dated January 8, 1901.

Application filed October 23, 1899. Serial No. 734,451. (No model.)

*To all whom it may concern:*

Be it known that I, CARL W. LARSON, a subject of the King of Sweden and Norway, residing at Schenectady, county of Schenectady, State of New York, have invented certain new and useful Improvements in Brush-Carriers, (Case No. 1,111,) of which the following is a specification.

This invention relates to an improvement in brush-carriers for electric machines, and is particularly useful in connection with machines the direction of rotation of which is frequently reversed or which are in inaccessible locations, as railway-motors.

A brush-carrier constructed in accordance with the present invention is caused by a reverse movement of the armature-shaft to be moved so that the lead of the brushes is changed to the proper point for the new direction of rotation of the armature and commutator.

Figures 1 and 2 are end and side views of an electric machine upon which a brush-carrier of the above description is mounted, and Figs. 3 and 4 are like views of a machine upon which is mounted a similar carrier, the construction of which is slightly modified.

A is an arm loosely mounted on the armature-shaft 1. A spring-plate S, with its edge serrated to permit play, is held against the arm by a nut N, formed with an indentation for a spanner-wrench. This device serves to regulate the force permitted to be exerted by the armature-shaft upon the arm A.

A brush-carrier C, upon which brush-holders H are mounted for radial adjustment with respect to the commutator, is formed with grooves G, concentric with the shaft 1, in which engage studs T, secured to the machine or its casing. When the direction of rotation of the shaft 1 is reversed, the arm A, pressed against the shaft by the spring S, is given a partial revolution, whereby the flexible connections F, attached to the end of the arm and to the ring O in the carrier C, are moved over the movable bearings or pulleys P to cause the carrier to be moved in a direction opposite to the direction of revolution of the arm A. This movement of the arm A continues until the opposite ends of the concentric grooves G abut against the studs T. Tension devices or turnbuckles B are attached to the flexible connections F.

In the modified form (shown in Figs. 3 and 4) the friction-wheels $A'$ and $A^2$ are the equivalents of the arm A in Fig. 1. The bearing-plate $F'$ is pivoted to the carrier C and is pressed upon the friction-wheel $A^2$ by a spring $S'$, secured to the carrier.

What I claim as new, and desire to secure by Letters Patent of the United States, is—

1. The combination in an electric machine, with a brush-carrier mounted on a fixed portion thereof, and movable concentric with the armature, of brushes which are carried in continuous engagement with the commutator, and means whereby the reversed rotation of the armature causes the brush-carrier to be moved in a direction opposite to the reversed direction of movement of the armature, to reverse the lead of the brushes.

2. The combination in an electric machine, with a brush-carrier movable concentric with the armature, of brushes which are carried in continuous engagement with the commutator, a friction device controlled by the armature, and flexible connections between said device and the brush-carrier, whereby the reversed rotation of the armature causes the brush-carrier to be moved in a direction opposite to the reversed direction of movement of the armature, to reverse the lead of the brushes.

3. The combination in an electric machine, with a brush-carrier carried in continuous engagement with the commutator, of a friction device controlled by the armature-shaft, a spring-plate pressing against the friction device, and connections between the latter and the brush-carrier, whereby the reversal of the armature causes the brush-carrier to be moved in a direction opposite to the reversed direction of movement of the armature, to reverse the lead of the brushes.

4. The combination in an electric machine, with a brush-carrier movable concentric with the armature, of an adjustable friction device controlled by the rotation of the armature, means connecting the brush-carrier and the friction device, whereby the reversal of the armature causes the brush-carrier to be moved in a direction opposite to the reversed direction of movement of the armature, to reverse the lead of the brushes, and means independent of the movement of the armature for varying the adjustment of the friction device.

5. The combination in an electric machine, with a brush-carrier movable concentric with the armature, of a friction actuating device loosely mounted on the armature-shaft, connections between said device and the brush-carrier, whereby the reversal of the armature causes the brush-carrier to be moved in a direction opposite to the reversed direction of movement of the armature, to reverse the lead of the brushes, a spring which bears against the friction device, and a nut for adjusting the tension of the spring.

6. The combination in an electric machine, with a brush-carrier having concentric slots, of studs rigidly secured in said machine and engaging said slots to support said carrier, and means whereby said carrier is moved by a reverse rotation of the moving member of said machine to reverse the lead of the brushes.

7. The combination in an electric machine, with a brush-carrier provided with slots concentric with the armature, of supports secured in a fixed portion of the machine and engaging in the concentric slots, brushes carried in continuous engagement with the commutator, and means whereby the reversal of the armature causes the brush-carrier to be moved in a direction opposite the reversed direction of the movement of the armature, to reverse the lead of the brushes.

8. A brush-adjusting device, comprising a movably-mounted brush-carrier, brushes carried thereby in continuous contact with the commutator and a lever-arm independent of the carrier, frictionally mounted on the armature-shaft and adapted to move the brush-carrier.

9. The combination in an electric machine, with a brush-carrier movably mounted thereon, of idler-pulleys mounted on said machine, an actuator operated by the moving member of the machine, and flexible connections between said actuator and carrier and moving on said idlers, whereby the actuator moves the carrier in a reverse direction to that of the armature.

10. The combination in an electric machine, with a brush-carrier mounted on a fixed part of the machine, and movable concentric with the armature, of a friction device controlled by the movement of the armature, and flexible connections between said device and the brush-carrier, whereby the carrier is moved by the armature reversely to the direction of movement of the latter.

11. The combination in an electric machine, with a brush-carrier movable concentric with the armature, of brushes carried in continuous engagement with the commutator, a friction device mounted on the armature-shaft, a spring-plate having a serrated periphery and which presses the friction device into engagement with the armature, and connections between the friction device and the brush-carrier whereby the reversal of the armature causes the brush-carrier to be moved in a direction opposite to the reversed direction of movement of the armature, to reverse the lead of the brushes.

12. The combination in an electric machine, with a brush-carrier mounted on a fixed part of the machine, and movable concentric with the armature, of brush-holders mounted on the carrier and adjustable radially with respect to the commutator, and means whereby the armature moves the carrier in an opposite direction with respect to its own rotation.

In witness whereof I have hereunto set my hand this 20th day of October, 1899.

CARL W. LARSON.

Witnesses:
BENJAMIN B. HULL,
MABEL H. EMERSON.